United States Patent [19]

Bowers

[11] 3,985,239

[45] Oct. 12, 1976

[54] APPARATUS FOR REMOVING A HOLLOW ARTICLE FROM MANDREL

[75] Inventor: Kenneth E. Bowers, Prairie Village, Kans.

[73] Assignee: Ethyl Development Corporation, Kansas City, Mo.

[22] Filed: Apr. 28, 1975

[21] Appl. No.: 571,929

[52] U.S. Cl. .............................. 214/1 BD; 101/44; 198/489

[51] Int. Cl.[2] .............................. B65G 47/00

[58] Field of Search .................... 198/27; 214/1 BD; 101/7, 38 A, 37, 40, 43, 44

[56] References Cited

UNITED STATES PATENTS

| | | | |
|---|---|---|---|
| 1,388,916 | 8/1921 | Biggs | 214/1 BD |
| 3,001,632 | 9/1961 | Bell | 198/27 X |
| 3,168,863 | 2/1965 | McRae | 101/43 |
| 3,209,922 | 10/1965 | Melvin | 214/1 BD |

*Primary Examiner*—Evon C. Blunk
*Assistant Examiner*—Douglas D. Watts
*Attorney, Agent, or Firm*—Donald L. Johnson; John F. Sieberth; Edgar E. Spielman, Jr.

[57] ABSTRACT

An apparatus for removing a hollow article from a mandrel is disclosed. The apparatus features an engaging member for contacting the hollow article and an assembly for bringing the engaging member from close proximity to the article into contact with the article and for applying a force through the engaging member to the article so as to remove it from the mandrel. The assembly includes a pivoted rod and a slidable collar mounted thereon, the collar being attached to the engaging member. Motion of the collar up and down the rod is achieved by a reciprocating power cylinder which communicates with the slidable collar by means of a slotted arm. The slotted arm is movably connected to the collar by means of a pin mounted on the collar. Not only does the follower pin slide within the slot of the arm, it also is slidable within a track defined in a plate which is adjacent to the rod. The track is of a configuration such that upon actuation of the power cylinder the engaging member is brought, first, from a position proximate to and beneath the hollow article, up towards the article to achieve contact with the article and then, secondly, away from the mandrel so as to remove the article from the mandrel.

5 Claims, 5 Drawing Figures

APPARATUS FOR REMOVING A HOLLOW ARTICLE FROM MANDREL

BACKGROUND OF THE INVENTION

Hot stamp printing has been used for a number of years to supply decorative relief or printed indicia upon the surface of plastic articles--in particular upon the faces of plastic bottles and containers. In this art a strip of foil carrying either a pigment coating or a thin metal coating thereon is interposed between the article desired to be imprinted and a die plate which contains a heated element having the desired display or indicia thereon. The article is pressed firmly against the heated die, and the pigment is transferred from the carrier foil to the surface of the plastic container by partially melting the container surface and fusing the pigment coating thereto.

To bring the article into contact with the strip of foil and the die plate there is generally provided a multispoked apparatus which carries the article. The article is mounted onto a mandrel carried by each of the spokes, with the mandrel generally having a spring-loaded gripping mechanism to provide frictional forces to hold the bottle to the mandrel during the stamping step. Exemplary of such mandrels is the one disclosed in U.S. Pat. No. 3,732,807. The bottle is positioned for contact by registering each spoke into proximity of the die and foil.

After the bottle has been stamped, removal of the bottle from the mandrel must be accomplished. In many instances removal is done by hand and in these instances the removing step, for obvious reasons, is expensive and time consuming. In other instances complex mechanisms have been developed to automatically remove the article from the mandrel. But since these mechanisms are complex, maintenance of the mechanisms is frequent thus resulting in considerable amount of non-productive time.

Therefore it is an object of this invention to provide an apparatus which automatically removes hollow, plastic articles from the mandrel and which is simple in operation and construction and thus nearly maintenance free.

THE INVENTION

This invention relates to an apparatus for removing hollow, articles from a mandrel which apparatus includes: an elongated pivoted rod; a collar slidably mounted on the rod; an engager for engaging the article, the engager being connected to the collar; a follower connected to the collar; an elongated arm having a front portion and a back portion in which, (i) the front portion has a slot therein for receipt of the follower, (ii) the front portion and the back portion intersect to form an obtuse angle, and (iii) the arm is pivoted at a point adjacent the intersection; a power assembly communicative with the arm for imparting arcute motion to the arm about its pivot point; and a track for receipt of the follower, the track having a configuration such that upon arcuate motion of the arm the engager will move along a path to engage the bottle and remove it from the mandrel.

As can be appreciated from the foregoing, the apparatus of this invention is the paragon of simplicity. Even though the apparatus is uncomplicated, it is very capable of achieving the results for which it is designed. Maintenance costs on this apparatus will be very low as the only member which could forseeably require any sort of maintenance would be the power source.

These and other features contributing to use and economy in construction will become evident from the following description of a preferred embodiment of this invention illustrated in the following drawings in which identical numerals refer to identical parts and in which.

Figure 3:
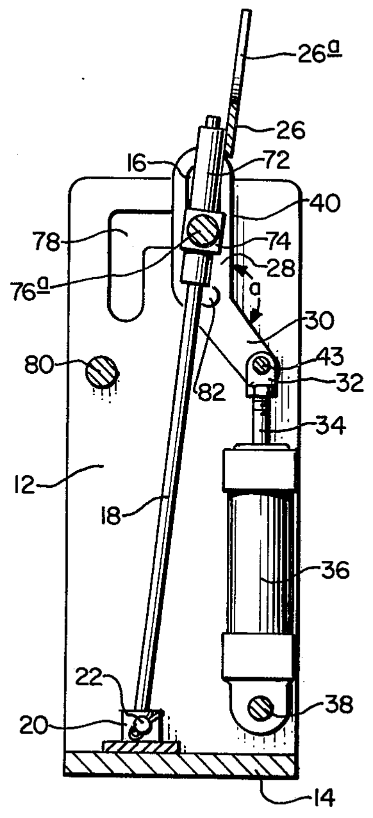
FIG. 3 is a sectional view taken along section lines 3—3 in FIG. 1.
Figure 3B:
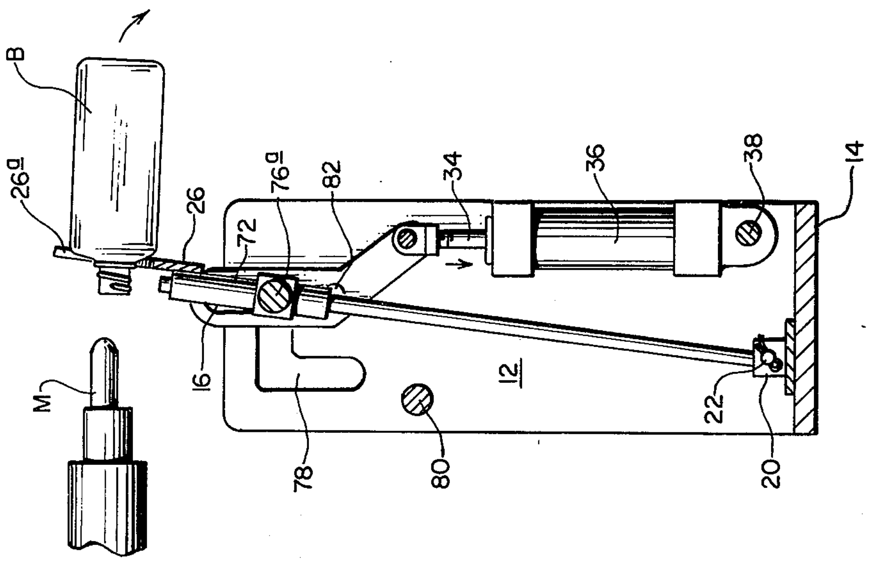
Figure 3A:
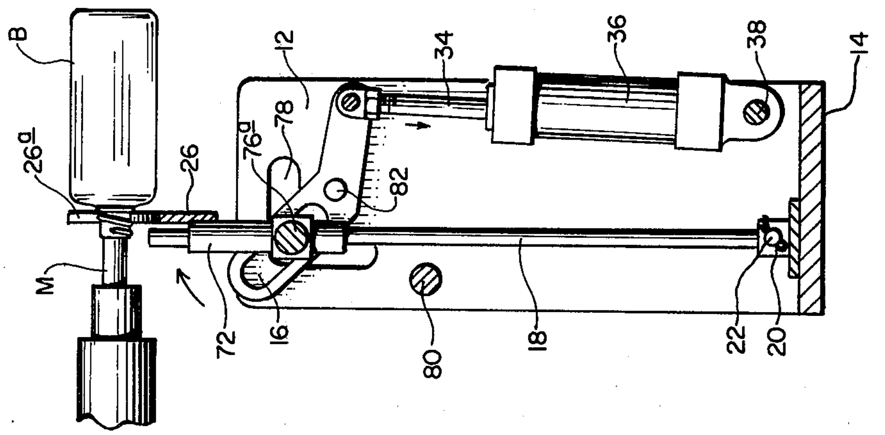

FIG. 3*a* is the sectional view shown in FIG. 3 showing the apparatus in operation before engagement with the plastic article to be removed from the mandrel; and FIG. 3*b* is the sectional view shown in FIG. 3 after the plastic article has been engaged and has been removed from the mandrel.

Figure 1:
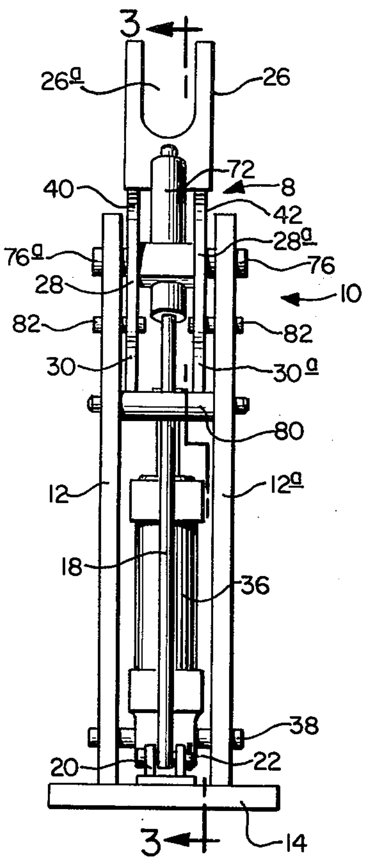
FIG. 1 is a front elevational view of the apparatus of this invention.
Figure 2:
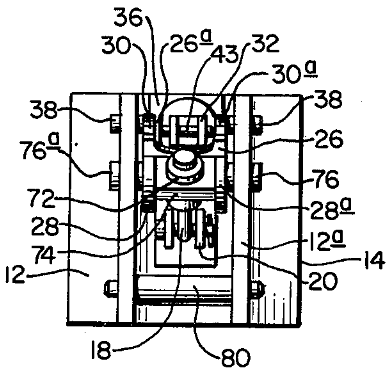
FIG. 2 is a top plan view of the apparatus shown in FIG. 1.

Referring now to FIGS. 1–3, it can be seen that an article removing apparatus of this invention, generally designated by the numeral 10, has an elongated arm member, generally designated by the numeral 8. In the embodiment illustrated arm member 8 has left subarm 40 and right subarm 42. Left subarm 40 has front portion 28 and rear portion 30 as does right subarm 42 which has front portion 28*a* and rear portion 30*a*. The front portions intersect their respective rear portions to form an obtuse angle. The angle, a, formed by the front portions and the rear portions is generally within the range from about 90 to about 135°. Obtuse angle *a* shown in FIG. 3 is an angle of about 130° and has been found to be highly satisfactory.

Front portion 28 of left sub-arm 40 and front portion 28*a* of right subarm 42, both carry slots. Slot 16 is carried by front portion 28 as depicted in FIGS. 3–3*b*. Front portion 28*a* has a slot identical to slot 16 which is not shown in the drawings. These arm slots have their long axis running substantially parallel with the long edge of their respective front arm portions. It is to be understood that slots having other configurations may be used as long as these configurations result in the required motion of elongated arm member 8 as hereinafter described.

Elongated arm member 8 is pivotally mounted to right wall panel 12*a* and left wall panel 12 by arm pivot pin 82. As can be seen in FIG. 3, arm pivot pin 82 is positioned adjacent to the intersection of front portion 28 and rear portion 30 of left subarm 40. The same pivot position is obtained for right subarm 42.

Connected to left subarm 40 and right subarm 42 at a point adjacent to the terminal ends of their respective rear portions 30 and 30*a* is power cylinder 36. Power cylinder 36 may be either a pneumatic or hydraulic double acting cylinder or any other power source and/or power train capable of giving the required motion to arm member 8. Power cylinder rod 34 is coupled to left subarm 40 and right subarm 42 by means of hitch 32 and hitch pin 43. Maintaining power cylinder 36 in position is cylinder mount pin 38 which is carried by left wall panel 12 and right wall panel 12*a*.

Attached to bottom panel 14, which panel connects the bottoms of right wall panel 12*a* and left wall panel 12, is rod yoke 20. Rod yoke 20 pivotally carries rod 18 by means of rod yoke pin 22 and accompanying cotter key 22*a*. Slidably mounted on rod 18 is collar 72. Attached to the upper end of collar 72 is engager 26. As can be seen from the drawing, engager 26 has recess 26*a* cut therein. In the embodiment illustrated the recess gives engager 26 a yoke-like configuration. This configuration is preferred when the apparatus of this invention is used to remove hollow plastic containers from the mandrel. Of course, it is to be understood that other configurations are permissible and may be desirable, depending upon the particular shape of the article being removed from the mandrel.

Collar block 74 is also attached to collar 72 and carries followers **76*a* and 76. These followers are received in slot 16 in front portion 28 and in the corresponding slot in front portion 28*a*. Follower 76*a* and 76 are of sufficient length to also be received in tracks carried by left wall panel 12 and right wall panel 12*a*.**

A preferred follower comprises a shaft carrying a bearing. The bearing may be held on by snap rings to facilitate changing should the bearing become worn with use. It is to be understood that other types of followers may be utilized in the apparatus of this invention without derogating from the functionality thereof. For example, the followers may merely be pins--indeed pin-type followers would be very inexpensive but still very functional.

As mentioned above, followers **76*a* and 76 are also received in tracks carried by the wall panels. As can be seen in FIGS. 3, 3*a* and 3*b*; track 78 is carried by left wall panel 12. A like track is also carried by right wall panel 12*a* but is not shown. The particular configuration of track 78 and its corresponding track in right wall panel 12*a* will determine the particular path traveled by engager 26.** It has been found that for removing plastic containers off of conventional mandrels that tracks having a configuration substantially resembling an upside down L with the horizontal leg of the L turning in the direction away from the mandrel are preferred. However, it should be noted that other configurations are possible and may in some instances be desirable depending upon the mandrel and the bottle configuration.

As mentioned previously, bottom panel 14 connects bottom portion of left wall panel 12 and right wall panel **12*a*. To aid in rigidifying the wall structure of the apparatus, wall pin 80** is also utilized.

In operation, the apparatus of this invention operates in a simple and efficient manner. In the first stage of operation, engager 26 will be beneath the bottle. In this position, power rod 34 will be in its uppermost position with front portions 28 and **28*a* of subarm 40 and 42, respectively, being substantially parallel with the horizon. Followers 76 and 76*a* are positioned in the rightmost corner of the arm slots. When bottle B carried on mandrel M is registered above the apparatus, power cylinder 36 is actuated causing power rod 34 to be retracted and arm member 8 to be pivoted about arm pivot pin 82. This motion of arm member 8 will cause an upward force to be exerted on collar 72 causing it to move in an upward path coinciding with the direction of the vertical legs of the tracks. Since engager 26 is attached to collar 72, it likewise moves in the same direction and thus will come into engagement with bottle B. After engager 26 has engaged bottle B, it is desired then to have engager 26 move in a direction substantially parallel with but away from mandrel M. This is accomplished by a continual retraction of power rod 34 and the resultant continued arcuate motion of arm member 8. As can be seen in FIG. 3B, the continued arcuate motion of armed member 8 results in a force being exerted upon collar 72 in a direction substantially parallel to the mandrel M but away from it. The guidance of collar 72 in this direction is achieved by the horizontal legs of the tracks. After the bottle has been removed, power rod 34 will return to the start position causing reverse arcuate motion of arm member 8 and the return of collar 72 and engager 26** to the start position described above.

The apparatus of this invention may be made of any conventional materials such as metal, plastic, etc.

I claim:

1. An apparatus for removing hollow plastic articles from a mandrel which comprises:

a. an elongated rod pivoted at one end;

b. a collar concentrically and slidably mounted on said rod and located at the end opposite said pivoted end;

c. a yoke-shaped plate for engaging said article, said plate being connected to said collar so that the center axis of said rod bisects said plate;

d. a follower means connected to said collar;

e. an elongated bifurcated arm having a left subarm and a right subarm, each of said subarms having a front portion and a back portion wherein, i. said front portion has slot therein for receipt of said follower means, ii. said front portion and said back portion intersect to form an obtuse angle, and iii. said arm is pivoted at a point adjacent to said intersection, and wherein said rod is positioned between said subarms;

f. a power means communicative with said arm for imparting arcuate motion to said arm about its pivot point; and g. a track means also for the receipt of said follower, said track having a vertical leg and a horizontal leg which legs intersect at a right angle so that, upon arcuate motion of said arm, said engaging means will move along a path to engage said bottle and to remove it from said mandrel.

2. The apparatus of claim 1 wherein said obtuse angle is within the range of from about 90° to about 135°.

3. The apparatus of claim 1 wherein said power means is a double acting pneumatic cylinder.

4. The apparatus of claim 1 wherein said track means is at least one slot in a plate into which said follower means fits.

5. The apparatus of claim 4 wherein said apparatus additionally includes two oppositely opposed spaced-apart side walls, said elongated arm means being pivoted by way of a pivot pin carried by said side walls, and said slot being in at least one of said side walls.

* * * * *